US008676988B1

(12) United States Patent
Wanek et al.

(10) Patent No.: US 8,676,988 B1
(45) Date of Patent: *Mar. 18, 2014

(54) SYSTEMS AND METHODS FOR SECURE DATA EXCHANGE IN A DISTRIBUTED COLLABORATIVE APPLICATION

(75) Inventors: Charles Wanek, Boulder, CO (US); Dan Jones, Niwot, CO (US); Todd Vernon, Lafayette, CO (US)

(73) Assignee: Open Invention Network, LLC, Durham, NC (US)

( * ) Notice: Subject to any disclaimer, the term of this patent is extended or adjusted under 35 U.S.C. 154(b) by 187 days.

This patent is subject to a terminal disclaimer.

(21) Appl. No.: 12/611,391

(22) Filed: Nov. 3, 2009

Related U.S. Application Data

(63) Continuation of application No. 10/900,074, filed on Jul. 26, 2004, now Pat. No. 7,636,841.

(51) Int. Cl.
*G06F 15/16* (2006.01)
(52) U.S. Cl.
USPC .......................................... 709/227
(58) Field of Classification Search
USPC .......................................... 709/227
See application file for complete search history.

(56) References Cited

U.S. PATENT DOCUMENTS

| | | | |
|---|---|---|---|
| 6,178,505 B1 | 1/2001 | Schneider et al. | |
| 6,199,165 B1* | 3/2001 | Grunner | 726/3 |
| 6,560,707 B2* | 5/2003 | Curtis et al. | 713/163 |
| 6,584,564 B2* | 6/2003 | Olkin et al. | 713/152 |
| 6,687,831 B1* | 2/2004 | Albaugh et al. | 726/7 |
| 6,912,522 B2* | 6/2005 | Edgar | 1/1 |
| 7,006,633 B1* | 2/2006 | Reece | 380/260 |
| 7,016,499 B2* | 3/2006 | Perlman | 380/281 |
| 7,246,378 B1* | 7/2007 | Marvit et al. | 726/29 |
| 7,277,549 B2* | 10/2007 | Olkin et al. | 380/277 |
| 7,278,084 B2* | 10/2007 | Palin et al. | 714/758 |
| 7,292,692 B2* | 11/2007 | Bonan et al. | 380/212 |
| 7,325,127 B2* | 1/2008 | Olkin et al. | 713/152 |
| 7,409,545 B2* | 8/2008 | Perlman | 713/164 |
| 7,584,254 B2* | 9/2009 | Adams et al. | 709/206 |
| 7,636,841 B2* | 12/2009 | Wanek et al. | 713/163 |
| 2002/0013897 A1 | 1/2002 | McTernan et al. | |
| 2003/0051136 A1 | 3/2003 | Curtis et al. | |
| 2003/0078973 A1 | 4/2003 | Przekop | |
| 2003/0149725 A1 | 8/2003 | Worthen | |
| 2004/0193943 A1* | 9/2004 | Angelino et al. | 714/4 |

(Continued)

FOREIGN PATENT DOCUMENTS

| | | |
|---|---|---|
| WO | 0188674 A | 11/2001 |
| WO | 2004021665 A | 3/2004 |

OTHER PUBLICATIONS

Extended European Search Report for European Application No. 05802743.4 issued on Jan. 26, 2010.

(Continued)

*Primary Examiner* — Alicia Baturay
(74) *Attorney, Agent, or Firm* — Haynes and Boone, LLP

(57) ABSTRACT

A collaborative communication system that includes a plurality of endpoints and interconnecting nodes configured to communicate via messages over interconnecting channels. Each of the plurality of endpoints and/or interconnecting nodes can determine whether to apply protection to the messages on a per message basis and/or base on the interconnecting channel being used. Thus, a balance between adequate protection and use of system resources and bandwidth can be maintained.

33 Claims, 9 Drawing Sheets

(56) References Cited

U.S. PATENT DOCUMENTS

2004/0199762 A1* 10/2004 Carlson et al. ............... 713/153
2005/0265327 A1* 12/2005 Buch et al. ................... 370/389
2006/0059370 A1* 3/2006 Asnis et al. .................. 713/189
2009/0059833 A1* 3/2009 Conte et al. .................. 370/312

OTHER PUBLICATIONS

International Search Report and Written Opinion for International Patent Application No. PCT/US05/26038 issued Oct. 19, 2006.

* cited by examiner

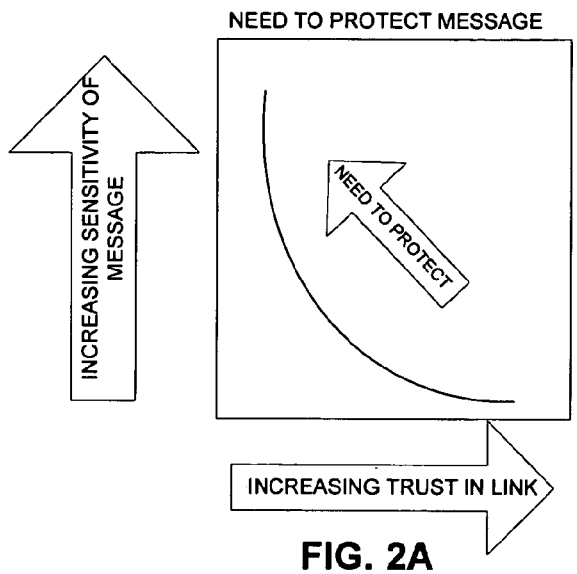
FIG. 2A
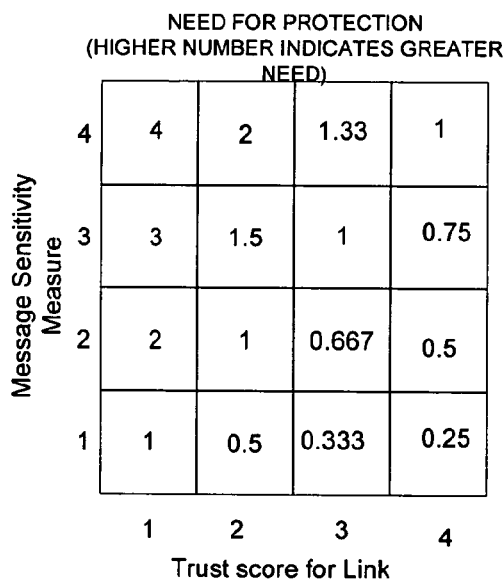
FIG. 2B
FIG. 2C

|  | | MESSAGE | | |
|---|---|---|---|---|
|  | SENSITIVE | | NOT-SENSITIVE | |
|  | ALREADY ENCRYPTED | NOT ENCRYPTED | ALREADY ENCRYPTED | NOT ENCRYPTED |
| LINK — UNSAFE | FORWARD (NO ENCRYPTION) | ENCRYPT AND FORWARD | FORWARD (NO ENCRYPTION) | FORWARD (NO ENCRYPTION) |
| LINK — SAFE | FORWARD (NO ENCRYPTION) | FORWARD (NO ENCRYPTION) | FORWARD (NO ENCRYPTION) | FORWARD (NO ENCRYPTION) |

FIG. 3

SYSTEMS AND METHODS FOR SECURE DATA EXCHANGE IN A DISTRIBUTED COLLABORATIVE APPLICATION

RELATED APPLICATIONS INFORMATION

This application is a continuation of, and receives the priority of, U.S. patent application Ser. No. 10/900,074, entitled "SYSTEMS AND METHODS FOR SECURE DATA EXCHANGE IN A DISTRIBUTED COLLABORATIVE APPLICATION," filed on Jul. 26, 2004, which is incorporated herein by reference in its entirety as if set forth in full. This application is related to: U.S. patent application Ser. No. 10/676,899, entitled "SYSTEMS AND METHODS FOR COLLABORATIVE COMMUNICATION," filed on Sep. 30, 2003; U.S. patent application Ser. No. 10/826,863, entitled, "SYSTEMS AND METHODS FOR SETTING UP A COLLABORATIVE COMMUNICATION SYSTEM," filed on Apr. 16, 2004; and U.S. patent application Ser. No. 10/826,865, entitled, "SYSTEMS AND METHODS FOR SETTING UP A SESSION IN A COLLABORATIVE COMMUNICATION SYSTEM," filed on Apr. 16, 2004, each of which is incorporated herein by reference in their entirety as if set forth in full.

FIELD OF THE INVENTION

This invention relates generally to systems and methods for distributed network communication and more particularly, to facilitating secure exchange of data among devices involved in a collaborative communication session using distributed network resources.

BACKGROUND OF THE INVENTION

Conventional communication networks are increasingly being used for distributed communication applications and services that are facilitated by the formation of communication support systems. Such communication support systems are formed by organizing a set of geographically distributed computers and interconnecting networks. In some cases, these computers and networks are dedicated to the specific application, but often the computers and networks are used for many purposes and are only temporarily part of the communication support system for a specific application while the application is active.

Once a communication support system is created for a specific application, the elements that comprise the application can use the system to exchange data with other distributed application elements. This data can include files, command and control instructions, status information or any other items required for operation of the application. Further, this data is typically exchanged by packaging it into units called messages, where a message contains data and some additional information about the data in the message, such as the source, destination, or other characteristics of the data.

One example of such an application is a multimedia collaboration system in which computers and networks exchange messages to allow remote participants to interact in a manner similar to face-to-face meetings as described in U.S. patent application Ser. Nos. 10/676,899, 10/826,863 and 10/826,865.

Some of the data exchanged in a collaborative application can comprise sensitive information making it desirable to protect it from interception by unauthorized observers. It is also often desirable to prevent spurious data from being introduced into the communication support system, such as from a nefarious person trying to interfere with or disable the application, or some component thereof. Some conventional systems address these needs by applying encryption or encoding schemes; however, encryption or encoding requires additional processing overhead in both the sending and receiving computers and may increase the size of the messages sent. Thus, encryption adds overhead and reduces performance in proportion to the quantity of data encrypted. When not all data is sensitive, encrypting all messages reduces performance without corresponding improvement in security.

When messages are transferred between computers in a communication support system, a message may travel through several intermediate nodes and multiple network links as it travels between source and destination. The links used between two specific computers may vary depending on the message destination, link availability, or other criteria. Network links vary considerably in many aspects, including the degree of resistance to unauthorized observation, interception, or introduction of data. Typically, the exact set of links to be used is not known prior to sending the message. Thus, it is not usually possible to evaluate the security of the path a message will take prior to sending a message. Conventional systems often permit security provisions to be made only for a complete end-to-end path. This produces a significant limitation since security settings must be configured according to the least secure link in the message path and most secure data message to be transferred. This limitation becomes worse when the message travels through a large number of network links, as is common in distributed applications. Thus, conventional systems often overprotect data to accommodate the weakest link.

Moreover, the degree of trust of a particular link is a judgment made by a person, and persons making such judgments may vary in reliability, criteria used, or intent. For example, an assessment that a network internal to a company is secure, made by a company-employed expert, is more likely to be trusted by company executives than an external network link judged to be secure by an unknown person. Yet the same network may be judged to be completely untrustworthy if assessed by an employee of a competitor.

Accordingly, the trustworthiness of a link is not absolute and is dependent on perspective, i.e., in conventional systems it is an subjective determination. A link may be judged to be completely trusted by one observer, and completely untrusted by another, and both observers may be correct from their respective points of view. Many conventional systems, however, do not allow different observers to specify differing levels of trust.

As a result, the degree of trust appropriate for a given network link is complex and may depend on the type of data, the source, and the person making the assessment of trustworthiness. The complexity increases when a message traverses many links while en route between computers. Conventional systems are limited in that they only offer, for example, an option that all communications are encrypted or all not encrypted. Differing degrees of trust or treatment of individual links between nodes is not possible.

A further limitation of conventional systems, such as Secure Socket Layer (SSL) systems, is that the a decision to encrypt must be made when the connection between elements is established, rather than as messages are forwarded using the connection. Yet complex applications often use a single connection to send many types of data and messages that often have differing protection requirements. These requirements may change dynamically over time or after the connection is established. Conventional systems do not permit messages to be selectively protected. Conventional systems also do not permit dynamic changes in protection policy. Thus, the originator of data often is not able to exercise fine-grained control over message protection in conventional systems.

Thus, conventional systems are limited in that either all data is encrypted or none, and the link between computers is either treated as trusted and secure or not. No breakdown of data into messages and links is possible when deciding if encryption is needed or not.

Another limitation of conventional systems is that they are not configurable to the specific needs of an application, but only allow a decision if all data to be exchanged on a connection will be encrypted or not. Yet complex applications often require more sophisticated security systems that are hierarchical, varied in scope, and allow dynamic consideration of the sensitivity of messages and the trustworthiness of network links.

SUMMARY OF THE INVENTION

A highly flexible distributed communication system for providing security of messages exchanged between elements of a distributed application, wherein a decision to use encryption or other data protection can be made each time a message is moved over a network link.

In one aspect, encryption can be used only when it is appropriate, based on the endpoint membership, the properties of the message, the degree of trust in the network link, and whether encryption has previously been applied to the message.

In another aspect, messages may be encrypted at sending endpoints or flagged as sensitive so that they can be encrypted later, as needed, at network nodes.

These and other features, aspects, and embodiments of the invention are described in the section entitled "Detailed Description of the Preferred Embodiment."

BRIEF DESCRIPTION OF THE DRAWINGS

Features, aspects, and embodiments of the inventions are described in conjunction with the attached drawings, in which:

FIGS. 2A-2C illustrates how various functions of continuous and discrete variables may be applied as decision criteria when deciding if a message is to be protected;

FIG. 3 shows a truth table of a three-variable Boolean function applied to determine if message protection is to be applied;

DETAILED DESCRIPTION OF INVENTION

While specific embodiments are discussed below, it should be understood that this is done for illustration purposes only and that other components, algorithms, and configurations can be used in accordance with the systems and methods described herein. Also, the illustrations below use a small number of endpoints connected by simple network links to simplify the description of various embodiments; however, no limitation to the number of endpoints or type of connections should be inferred.

Figure 1A:
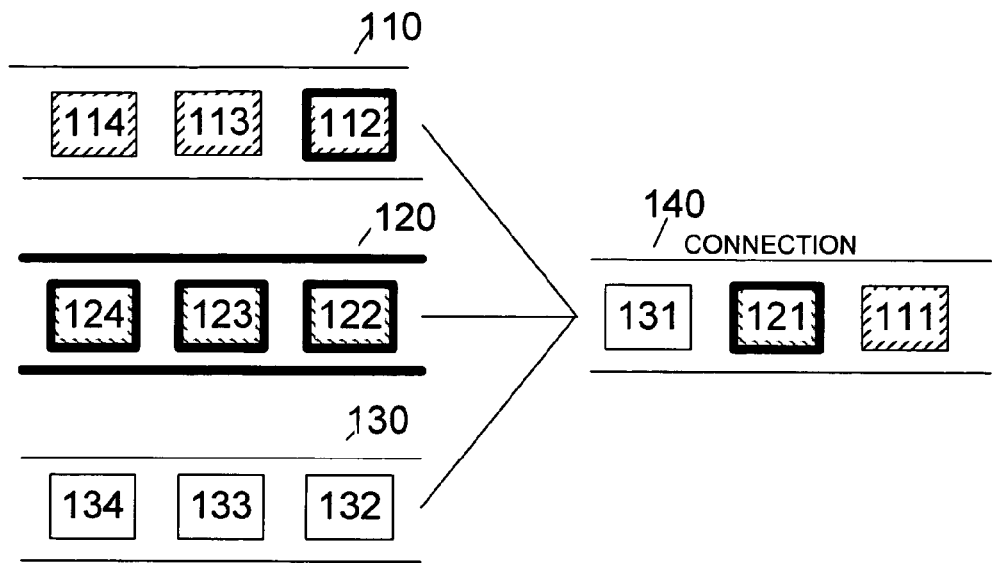
FIGS. 1A-1B illustrates schematically how selective protection is applied in an embodiment where data from several sources is multiplexed across a single connection.
Figure 1B:
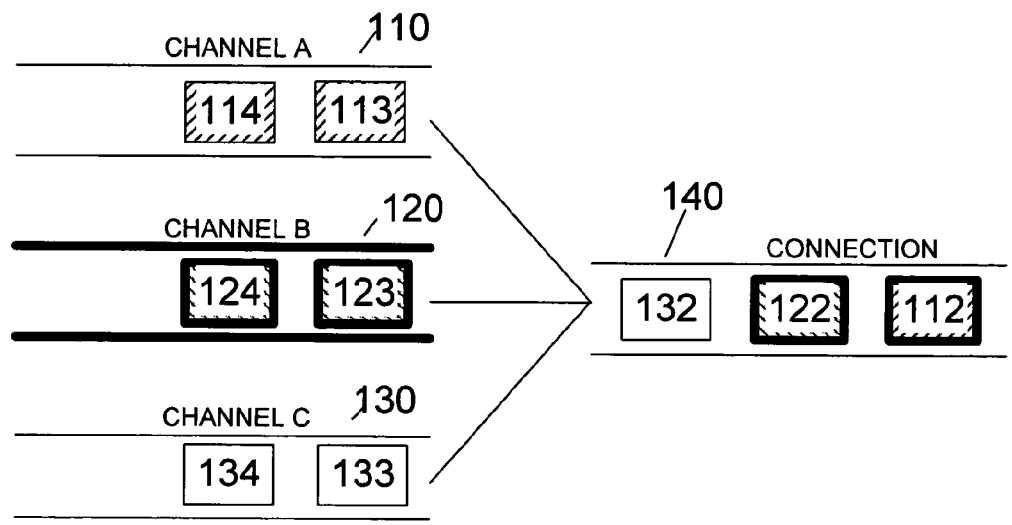

FIG. 1A is a diagram illustrating how an application element can be configured to send messages to one or more other elements using selective protection in accordance with one embodiment of the system and methods described herein. FIG. 1A and FIG. 1B illustrate the same system at different points in time. Three channels or data sources 110, 120, and 130 are shown, although this is for simplicity as more data channels or sources can also be accommodated by the systems and methods described herein. Channels 110, 120, and 130 can be configured to transmit data from different users, or of different types. For example, in one embodiment, channel 110 can be used to transmit video messages, channel 120 can be used to transmit audio messages, and channel 130 can be used to transmit status messages.

It should be noted that for purposes of this specification and the claims that follow, unless otherwise indicated expressly or by context, the term "connection" refers to the physical components or mechanisms for connecting two endpoints. For example, if two endpoints are connected via a cable, then the term connection refers to the physical cable. Similarly, if the two endpoints are connected via a wireless interface, then the term connection would refer to the wireless interface connecting the two devices. The term "link", or other appropriate term may be interchanged with the term "connection". Whereas, the term "channel" is intended to refer to the actual communication resources used by endpoints to communicate with each other. For example, when one endpoints is to communicate with another, it can open a channel over whatever connection is being used to connect the two endpoints and begin communicating. Thus, a channel can be defined by communication protocols, bandwidth, etc., as well as the connection used to support the channel.

In the example of FIG. 1A, four messages are shown that originate from channel 110. These messages are messages 111, 112, 113, and 114. Similarly, four messages are also shown that originate from channel 120. These messages are messages 121, 122, 123, and 124. Four messages are also shown that originate from channel 130. These messages are messages 131, 132, 133, and 134. All messages from the three channels are to be sent through a common communication connection 140. In one embodiment, common connection 140 can be a connection established using the Transmission Control Protocol (TCP), which is widely used in the Internet and networks in general.

As shown, communication connection 140 is not a protected communication path; however, it is desirable to provide protection for some messages sent across connection 140. In accordance with the systems and methods described herein, protection of messages sent across communication connection 140 can be performed dynamically as each message is sent. Moreover, depending on the embodiment, the designation of which messages are to be protected may be done at several levels and granularities. For example, in FIGS. 1A and 1B channel 110 produces some messages that need protection. Message 112, for example, is one of these, which is indicated in the figure by a bold outline. Thus, protection for messages 111, 112, 113, 114 from channel 110 is specified on a message by message basis, in this case for message 112. A message that is designated for protection is processed by a protection technique before sending on connection 140, while messages not designated for protection are sent without protection.

In a certain embodiment, all messages 121, 122, 123, 124 from channel 120 can require protection. Channel 120, can, for example, be associated with sensitive or proprietary data. Thus, protection for messages from channel 120 can be specified on a per-channel basis and, therefore, each message on channel 120 is designated for protection as indicated by the bold outline around messages 121, 122, 123, and 124. All messages from channel 120 can then be processed by a protection technique before sending on connection 140.

In the example of FIGS. 1A and 1B, messages from channel 130 do not need protection and thus are sent across connection 140 without protection.

In FIG. 1B the next message from channels 110, 120, and 130 have been sent via common connection 140. Message 112 has been protected because it was specified as a message needing protection. Message 122 is protected because it originated from channel 120 and, therefore, is automatically specified as needing protection. Message 132 is not protected because it was neither from a protected channel nor was identified as a message needing protection.

As described in more detail below, the decision to apply protection to messages can be based in whole or in part on the properties of connection 140 or on the properties of a message or properties of a channel producing the message, or on a combination of these properties. Further, depending on the embodiment, these properties and decision criteria can change over time. Yet dynamic changes in the properties or decision criteria can be accomplished without any change to connection 140. In one embodiment, for example, connection 140 is an unprotected, i.e., unencrypted connection, and protection is selectively applied as needed to each message.

In another embodiment, connection 140 can be a secure link. For example, connection 140 can be established using SSL. This can be useful if it is known that all messages to be sent across the connection will need protection. This can also be useful if it is known that many messages to be sent will require protection, such that more resources will be required to evaluate and selectively protect each message than using a secure connection. In this way, great flexibility is provided in specification and application of message protection.

FIG. 2A shows graphically how properties of a message or its content are used to determine if a message needs to be protected, according to an embodiment of the systems and methods described herein, where degree of trust and degree of sensitivity are two determining variables. As can be seen, the vertical axis represents increasing message sensitivity, while the horizontal axis represents increasing link trustworthiness. Generally, increasing message sensitivity or decreased network link trust argue for greater protection, or where different protection or encryption schemes are available, argue for use of stronger protection techniques.

In many embodiments the variables used to define the level of protection are not continuous, but rather can be assigned discrete levels. FIG. 2B shows one such embodiment where the trust and sensitivity are the variables of interest and each has a possible range of 4 discrete levels, e.g., they are scored from 1-4, and the resulting need for protection is a function of the two variables and their associated score. Specifically, in the embodiment shown in FIG. 2B, the function used to combine the two variables and arrive at a required degree of protection is sensitivity of message divided by trustworthiness of the link. In practice, any number of levels of link trust or message sensitivity can be used and any appropriate function for combining the two input variables could be applied.

In another embodiment, as illustrated in FIG. 2C, the number of discrete levels is exactly two, allowing use of simple Boolean logic to determine the need for protection.

It can be appreciated that other embodiments would consider other properties of the message when deciding if data protection is needed. For example, the destination or type of content can, depending on the embodiment, be of importance. Any properties of a message, criteria, variables, or function for combination of variables can be considered as required by a particular implementation.

FIG. 3 is a truth table that illustrates another embodiment, where a decision to protect, e.g., encrypt, a message is based on three variables: a message sensitivity flag, a link trustworthiness flag, and a flag that indicates if the message has been previously encrypted. In this embodiment each of the variables can have a value of either true or false. The function illustrated can be applied to a message every time the message is forwarded, using the current values of these variables. The values of these variables can, in certain embodiments, change as the message is forwarded and so can have different values at different times and points in the message path through the network. For example, a message that is encrypted would have the "previously encrypted" variable set to a value of false prior to encryption and true after encryption.

Often, the decision on whether to protect a message so as to achieve the efficiencies and the resource allocation benefits described herein, is better made at an interconnecting network node. Therefore, in certain embodiments, interconnecting nodes can be configured to make the protection determinations on a message by message or channel basis.

FIGS. 4A-4E are diagrams illustrating how messages flow through network nodes to their destination using the protection decisions and algorithms described herein. For example, in FIG. 4A, a message is transferred from originating node, or endpoint, 402 to destination node 406. The first message transfer is from origination node 402 to another intermediate node 404 using a network link 408. Node 402 can determine that the transferred messages does not require protection, using the methods described above. Thus, for example, no encryption is applied to the message being transferred via link 408.

The message can then be received at node 404 after intermediate node 404 transfers the message via network link 410. Prior to transferring the unencrypted message to node 406, node 404 can also determine that protection is not needed and, therefore, perform the transfer to destination node 406 without encryption. The determination by node 404 can be made using the methods described above, or node 404 can simply look to see if the message was protected when transferred by node 402 and then apply protection in accordance with that determination.

Figure 4A:
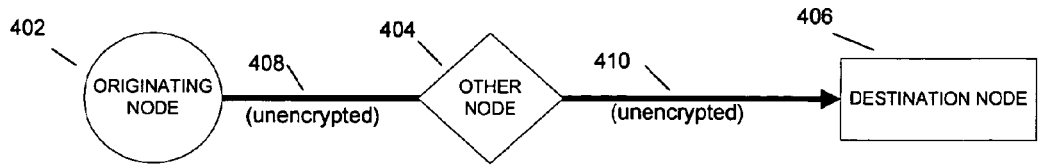
FIGS. 4A-4E is an illustration of several cases where a message is transferred across multiple network links and protection is selectively applied at each transfer.
Figure 4B:
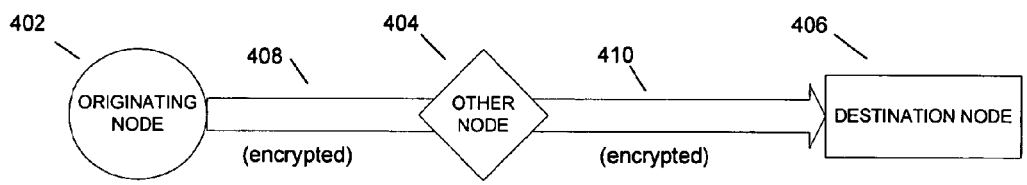

In FIG. 4B, a message is transferred from originating node 402 to destination node 406 via intermediate node 404. Prior to the first message transfer, from origination node 402 to intermediate node 404, node 402 can determine that the message to be transferred requires protection and can, for example, encrypt the message. When the message is received at node 404, node 404 can then determine whether protection is needed before transferring the message to destination node 406. In embodiment, node 404 simply determines that the message has previously been encrypted and forwards the already-encrypted message. In another embodiment nodes 402 and 406 form a secure connection path so that transfers through node 404 are performed without regard for individual message properties. In other embodiments, node 404 can employ the methods described above to determine if the message should be protected before transferring the message to node 406.

Figure 4C:
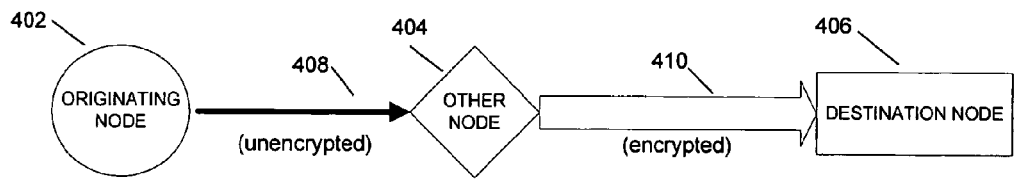
Figure 4D:
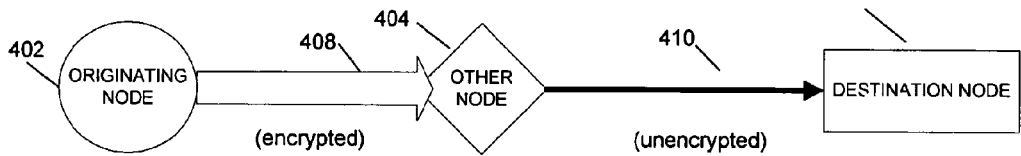

In FIG. 4C, a message is transferred from originating node 402 to destination node 406 through intermediate node 404. The first message transfer from origination node 402 to node 404 is unprotected, e.g., unencrypted; however, the second transfer from intermediate node 404 to node 406 is encrypted. This can occur because node 404 can be configured to determine independently whether the message should be protected before sending to node 406. For example, properties related to link 410, e.g., trustworthiness, or related to node 406 can require protection, where protection was not needed when transferring the message over link 408. Similarly, as illustrated in FIG. 4D, a message transferred with protection from node 402 to 404, can subsequently be transferred to node 406 without protection based on an independent determination by node 404.

Figure 4E:
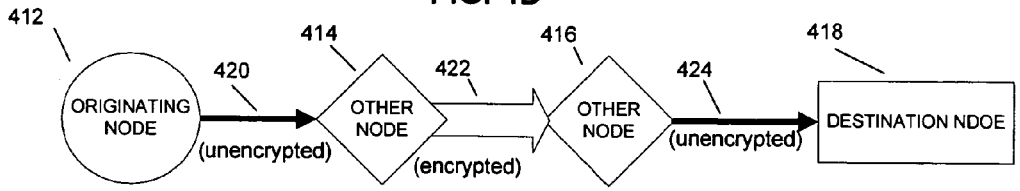

In FIG. 4E a message is transferred between originating node 412 and destination node 418 via multiple intermediate nodes 414 and 416. The message is sent from originating node 412 to node 414 without protection. When node 414 then initiates a transfer to node 416, it first determines that protection is required and thus, for example, encrypts the message before transfer. Node 416 can then initiate a transfer to destination node 418. As illustrated, however, no protection is applied to this final transfer.

As can be seen from FIGS. 4A-4E, a message can be transferred through multiple nodes, or endpoints, and at each step, a new determination of whether protection is required can be made. Thus, the optimum trade off of protection via resource usage and bandwidth can be maintained through the network on a message by message basis.

For the systems and methods described herein, the degree of trust in a given network link is often a variable of importance when deciding if a message is to be encrypted prior to forwarding over that link. The degree of trust placed in a link can be relative to the sending device. Further, the degree of trust need not be an absolute property associated with a specific link. Thus, a link can be assigned differing degrees of trust by different senders or observers, i.e., endpoints. This can be illustrated using the diagram of FIG. 5.

Figure 5:
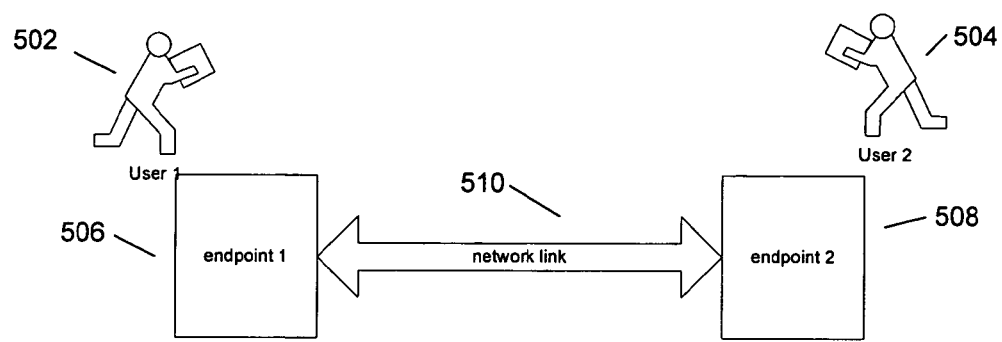
FIG. 5 shows how a network link can be assigned differing degrees of trust by different observers.

In the example of FIG. 5, a sender 502 wishes to send a message to user 504 via endpoint 506, communication link 510, and endpoint 508. Sender 506 determines that link 510 is trusted and can then configure endpoint 506 accordingly. Sender 504 also wishes to send a message to user 502; however, sender 504 does not regard link 510 as trusted and can configure endpoint 508 accordingly. Thus, according to an embodiment of the present invention, messages sent using link 510 from endpoint 508 will be encrypted, while messages sent using link 510 from endpoint 506 will not be encrypted. In another embodiment, only messages of certain types or possessing certain properties will be encrypted when sent over link 510 from endpoint 508.

Moreover, depending on the embodiment, the trustworthiness of a link can be defined in an abstract or general sense rather than in reference to a specific physical link. For example, it can be determined that all links outside a local network are not trustworthy. Or that any link using an Internet connection is not trustworthy.

It can be appreciated that the variable corresponding to the degree of trust for a link can be specified in many ways, all in accordance with the systems and methods described herein. In one embodiment, the degree of trust can specified in a local data file residing on a particular endpoint. In another embodiment, the specification is a table in memory included in a given endpoint. In still another embodiment, the trust specification can be obtained from a remote server, which, in one embodiment, is locally cached. In still another embodiment, the trust specification can be defined according to endpoint addresses. While in other embodiments the specification can be based on link characteristics.

In certain embodiments, the trust specification can be defined by a series of rules or heuristics to be applied to determine the trust specification for a specific network link. In one embodiment, a default trust specification is defined and other specifications or rules are subsequently applied that can result in a trust specification for a given network link different than the default.

It will be appreciated that there are many protection schemes that can be applied to protect messages. The systems and methods described herein do not rely on any particular message protection scheme, algorithm, or encryption/decryption mechanism, although some examples are discussed. It will also be appreciated that an encrypted message can subsequently be encrypted again by the same or different techniques. It should also be clear that recovering i.e. decrypting an encrypted message requires an inverse process corresponding to the encryption scheme or schemes used to encrypt the message. Therefore the terms encryption and decryption as used herein do not refer to a specific process, but to any process pair designed to protect and recover a message content.

In one embodiment, for example, public key encryption can be used. In such embodiments, data is encrypted using a published encryption key and protected data can subsequently only be decrypted by a matching protected or private key maintained by a destination endpoint. This allows any sender to encrypt messages to the destination if that destination's public key is available.

In another embodiment, a symmetric key scheme is used. In such embodiments, a specific set of endpoints share a matching encryption/decryption key or key pair which are then kept private from others and used to protect messages sent between the endpoints of the set.

It can be appreciated that various protection schemes have various advantages and disadvantages making them suited for different situations. Often it is desirable to combine various techniques to protect data in an effective or efficient manner. For example, in one embodiment, multiple contexts are involved. In the present description the term "context" refers to a binary membership state associated with each endpoint such that all endpoints must either be members or non-members of a particular set or subset defined by the membership state. An application can simultaneously have a plurality of contexts. The state defining the context and the meaning and members of the context are typically significant to the application and to the participation of the endpoint. For example, a context for endpoints can be "users currently logged-in." Another example context is "participant in meeting ID #1234."

Distributed applications of the type described herein often require participating endpoints to simultaneously be members of multiple contexts. These contexts can each have differing encryption and security requirements, which can be accommodated by the systems and methods described herein and as described below.

Figure 6A:
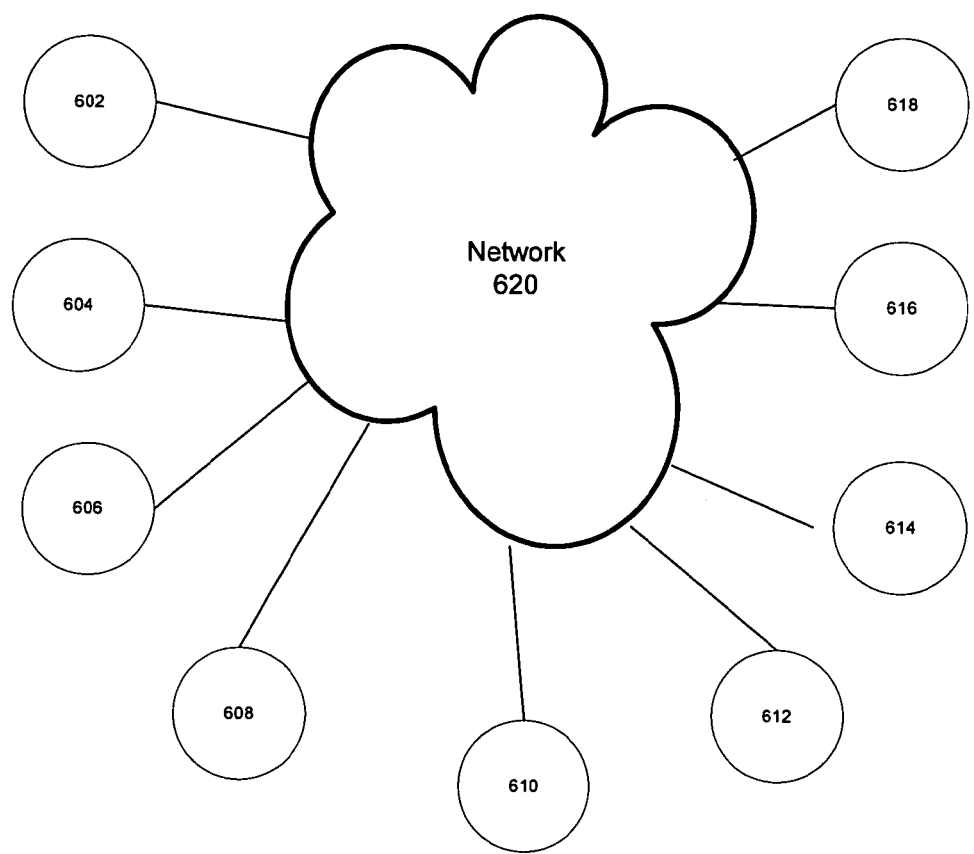
FIGS. 6A-6C illustrates the concept whereby endpoints may become members of multiple contexts for securing messages within the membership of the context.

FIG. 6A shows a set of endpoints 602, 604, 606, 608, 610, 612, 614, 618, interconnected by a network 620. Although the endpoints are shown as directly connected, the actual connection topology can vary considerably and include many links, intermediate nodes, routers, firewalls, and similar devices. The configuration shown is intended to simplify the discussion only and does not imply any limitations on compatible configurations. Similarly, only a few endpoints are shown for simplicity, but this should not be taken as implying any limitation or restriction on the number of possible endpoints or structure of the hierarchical contexts.

Figure 6B:
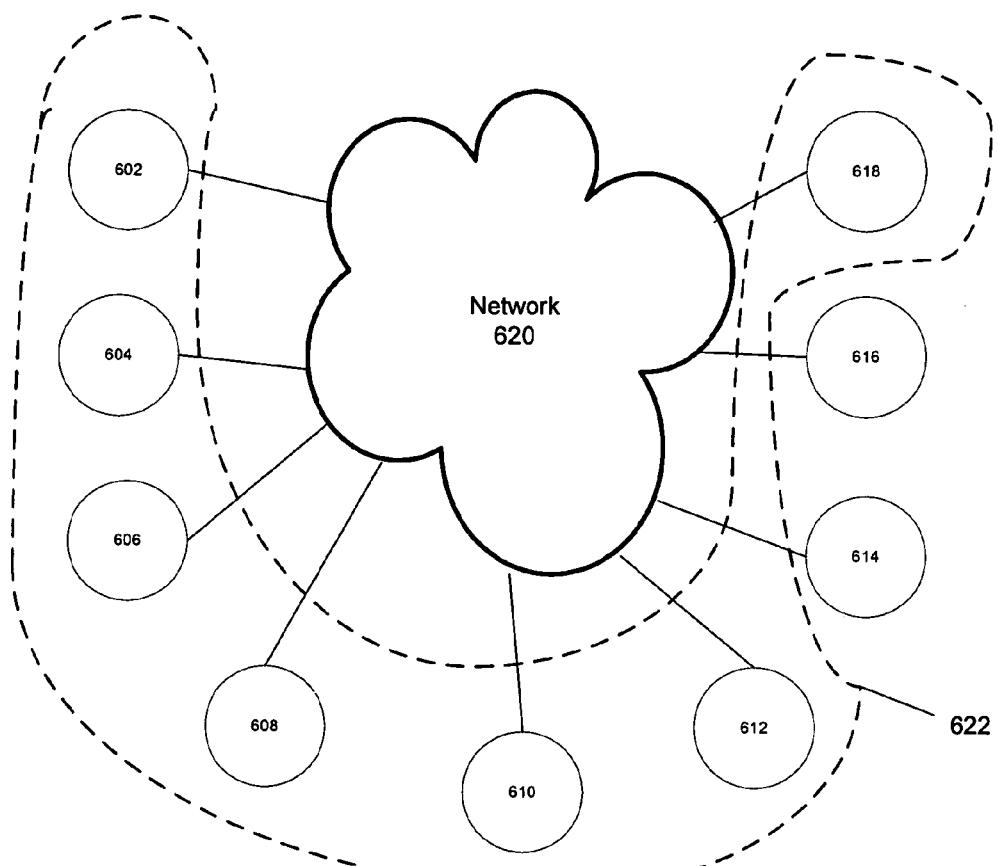

In FIG. 6B some of these endpoints have formed a common context 622. In particular, endpoints 602, 604, 606, 608, 610, 612 and 618 are members of common context 622. Endpoints 614 and 616 are non-members of common context 622. Forming context 622 can also be seen as forming a communication support system 622, or building a communication layer 622 on top of the existing network structure 620. Typically the endpoints comprising context 622 have performed a specific action or set of steps to create and join context 622. In one embodiment, context 622 can be a set of registered endpoints or authenticated users for a given application, resulting from a set of client endpoints registering with an authentication endpoint. In an embodiment where the application is an electronic collaboration system, for example, these endpoints can be users now available to join a meeting.

Figure 6C:
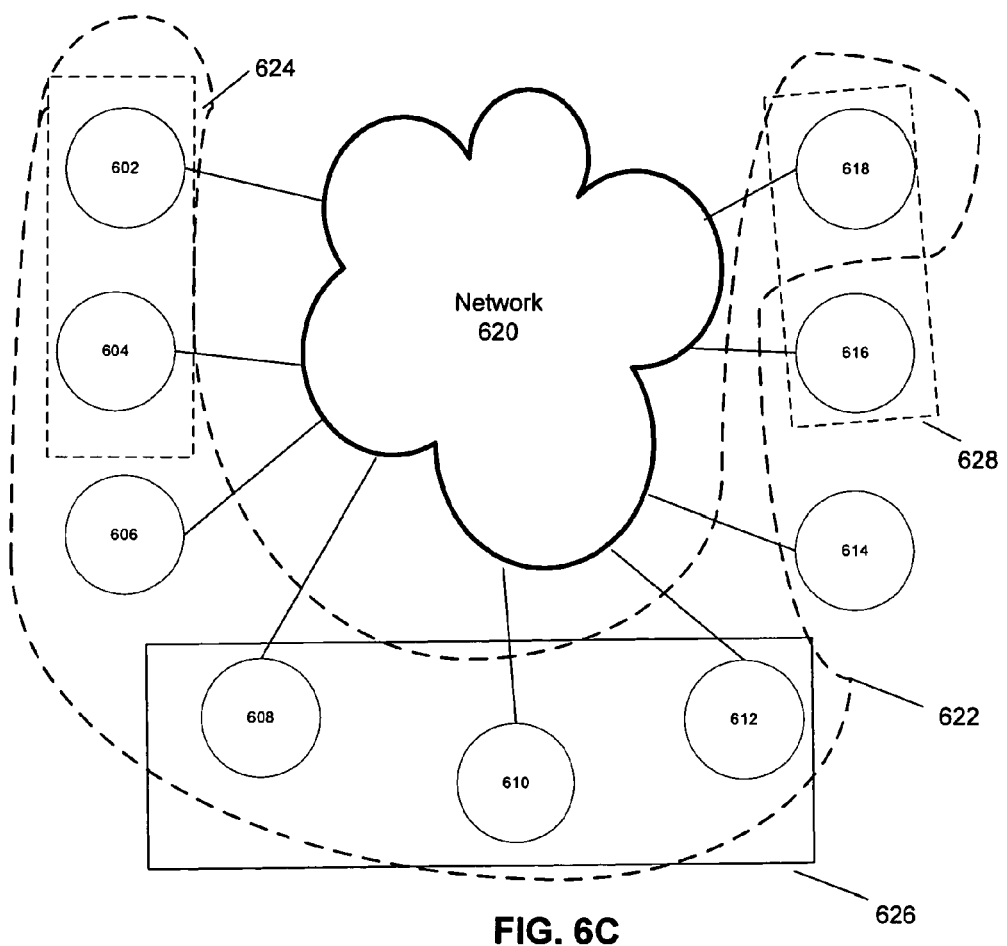

In FIG. 6C, further common contexts 624, 626, and 628 are formed comprising subsets of the endpoints, some of which are part of common context 622 and some of which are not. This may also be viewed as another layer or sub network. Thus, in the example of FIG. 6C context 624 comprises endpoints 602 and 604, context 626 comprises endpoints 608, 610, and 612, and context 628 comprises endpoints 616 and 618. In an electronic collaboration system, for example, contexts 624 and 626 can be active meetings, where endpoints 602 and 604 are participants in the meeting represented by context 624, and endpoints 608, 610, and 612 are participants in the meeting represented by context 626.

As can be seen, an endpoint can appear in multiple contexts, for example endpoint 602 is both in context 622 and context 624. Contexts can also be nested so that all members of a context are also members of another larger context. One context can be a proper subset of another. Contexts can be hierarchical in that all members of one context must first be members of another. Contexts can also include members from outside any other context, as context 628 contains endpoints 616 and 618, where endpoint 616 is not a member of another context but endpoint 618 is a member of context 622.

Formation of contexts can depend on many features of the types of activities, or services, engaged in by the endpoints as well as on properties related to the endpoints themselves. For example, in an electronic collaboration system, context formation can be based on different services such as video, application sharing, whiteboarding, etc.

An endpoint can, depending on the embodiment, simultaneously be a member of multiple contexts at multiple levels in a context hierarchy. For example, in FIG. 6C endpoint 602 is a member of contexts 622 and 624. In an electronic collaboration session embodiment, for example, endpoint 602 can represent a user who is a member of contexts "authenticated user," "participant in meeting A," "video user," and "voice user." Each context can have differing requirements for protection of messages. In addition each context has a different scope—that is, the contexts are created and destroyed over time and endpoints can join, exit or move among active contexts according to rules.

Thus, it can be desirable to use different encryption keys or even completely different mechanisms to provide message security for participant endpoints in each specific context. Importantly, a system configured according to the systems and methods described herein can have the ability to simultaneously support multiple simultaneous contexts with differing message protection schemes in each. In one embodiment, for example, an endpoint can simultaneously be participating in multiple secure contexts, requiring management of keys and algorithms. A message can be encrypted according to several different contexts and thus the encrypting device can be configured to select appropriately among the available contexts and keys.

Figure 7:
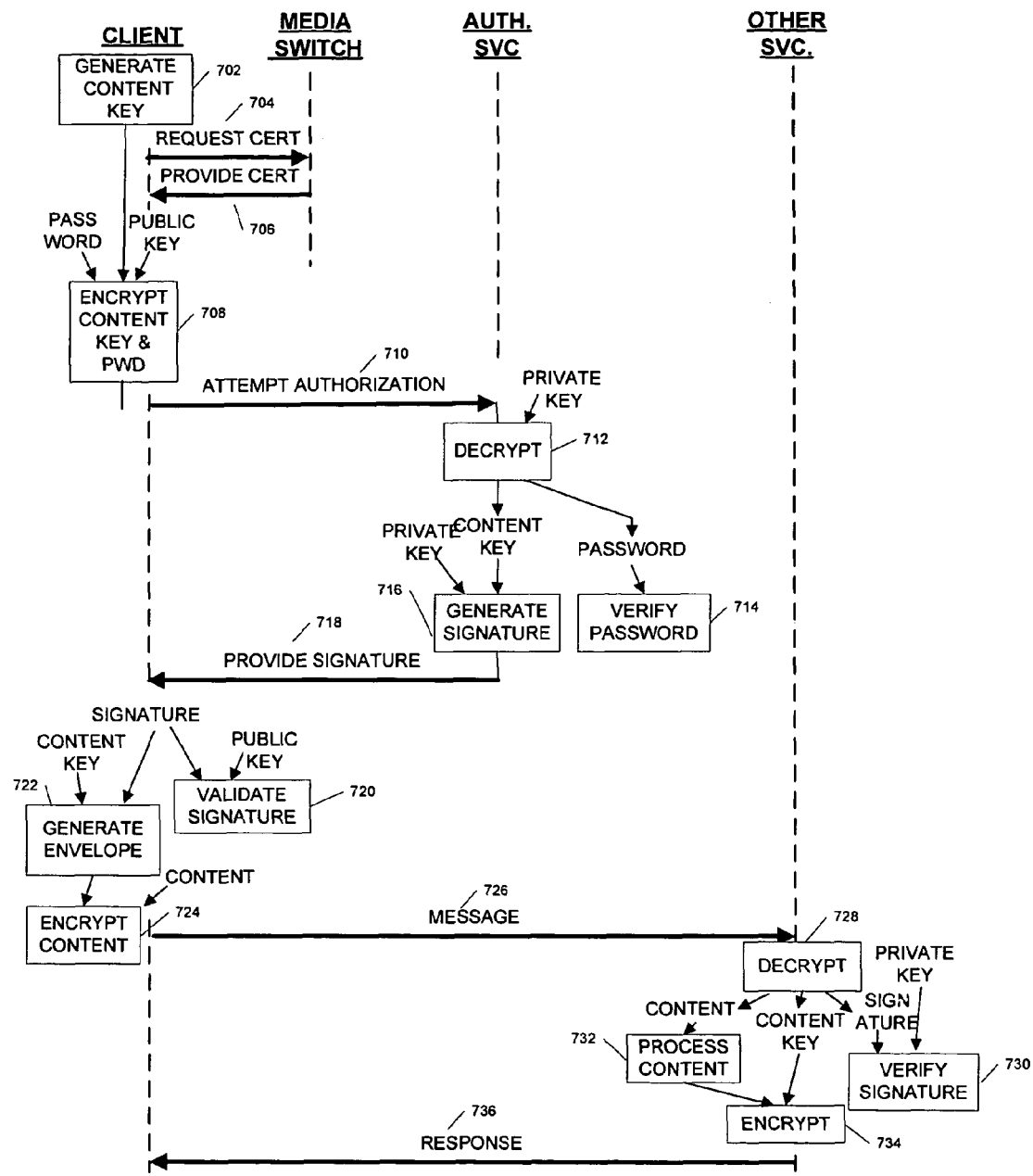
FIG. 7 is a data flow diagram for setting up an application according to an embodiment.

FIG. 7 illustrates an embodiment where different encryption keys are used by different contexts, showing how a system with multiple contexts functions in setting up an endpoint. In this case, the endpoint first joins one context and sets up a protection mechanism in that context, then uses that to set up an additional context. Thus, for example, a client, or endpoint, can generate a content key in step 702. The endpoint can then request certification from a media switch, with which it is in communication, in step 704. The media switch can provide the certification in step 706.

In step 708, the client can then encrypt the content that comprises a message to be sent to an authorization service associated with the first context. In the example of FIG. 7, public key-private key encryption is being used. The client can then attempt authorization by sending the encrypted message in step 710.

When the authorization service receives the encrypted message, it can use its private key to decrypt the content in step 712. In certain embodiments, the content can include a password that can be verified in step 714. Assuming that the password is verified, then the authorization service can generate a signature using a content key extracted form the decrypted message and the private key in step 716 and the signature can be provided to the client in step 718.

Once the signature is received, the client can verify the signature using its public key, in step 720, and can generate an envelope using the signature and the context key in step 722. The envelope can then, in step 724, be used to encrypt content for a message to be sent to a second service associated with a second context in step 726. The other service can decrypt the message in step 728 and verify the signature included therein in step 730 using the private key that the services share. The content of the decrypted message can be processed in step 732. A response to the message can then be encrypted, in step 734, using a content key extracted from the decrypted message. The response can then be sent to the client in step 736.

As mentioned the first service and the second service can use different private keys, and therefore implement different encryption. Moreover, the encryption can be implemented by each service and by the client on a message by message basis as described above.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A collaborative communication system, comprising:
a plurality of interconnecting channels configured to route messages between endpoints; and
a plurality of endpoints configured to communicate messages with other of the plurality of endpoints via the plurality of channels, each of the plurality of endpoints further configured to selectively apply protection to messages sent to other endpoints on a per message basis and based on dynamic system variables, the plurality of endpoints configured to identify a dynamic change in message properties, connection properties, properties of a channel producing the message or a combination of the message, connection and channel properties and selectively apply the protection as needed to each message without a change to a predefined connection, wherein to selectively apply protection to the messages sent comprises applying protection to at least one message among the messages to be transmitted across the predefined connection prior to transmitting the at least one message across the predefined connection.

2. The collaborative system of claim 1, wherein the system variables include properties related to an interconnecting channel used by the endpoint to send messages.

3. The collaborative system of claim 1, wherein the system variables include properties related to each message sent by the endpoint.

4. The collaborative system of claim 1, wherein the system variables include properties related to a connection used to support the interconnecting channel used by the endpoint to send messages.

5. The collaborative communication system of claim 1, wherein the system variables include interconnecting channel trustworthiness.

6. The collaborative communication system of claim 1, wherein the system variables include message sensitivity.

7. The collaborative communication system of claim 1, wherein the system variables include whether a message has previously been encrypted.

8. The collaborative communication system of claim 1, wherein each of the plurality of endpoints is configured to apply a decision criteria to the system variables in order to determine whether to apply protection to a message.

9. The collaborative communication system of claim 8, wherein at least some of the plurality of endpoints are configured to use different decision criteria relative to other of the plurality of endpoints.

10. The collaborative communication system of claim 8, wherein the system variables can be assigned a plurality of values, and wherein the decision criteria uses the values to determine whether protection should be applied.

11. The collaborative communication system of claim 10, wherein at least some of the plurality of endpoints are configured to assign a different value or weight to the system variables relative to other of the plurality of endpoints.

12. The collaborative communication system of claim 1, wherein at least some of the plurality of endpoints are configured to consider different system variables relative to other of the plurality of endpoints.

13. The collaboration system of claim 1, wherein the plurality of endpoints are configured to apply protection by encrypting the messages.

14. The collaboration system of claim 1, further comprising a plurality of intermediate nodes configured to pass messages from one endpoint to another via the plurality of interconnecting channels, and wherein the intermediate nodes can be configured to determine whether to apply protection to the messages on a per message basis.

15. The collaboration system of claim 1, further comprising a plurality of contexts, and wherein the plurality of endpoints are configured to join one or more of the plurality of contexts.

16. The collaboration system of claim 15, wherein each endpoint is configured to apply protection based system variables, and wherein the system variables are different for different contexts of the plurality of contexts.

17. The collaboration system of claim 15, wherein each endpoint is configured to apply protection based on decision criteria, and wherein the decision criteria are different for different contexts of the plurality of contexts.

18. A collaborative communication system, comprising:
a plurality of interconnecting channels configured to route messages between endpoints; and
a plurality of endpoints configured to communicate messages with other of the plurality of endpoints via the plurality of channels, at least some of the plurality of endpoints further configured to selectively apply protection to messages sent to other endpoints based on an interconnecting channel used to send the messages and at least some of the plurality of endpoints further configured to selectively apply protection to messages sent to other endpoints on a per message basis and based on dynamic system variables, the plurality of endpoints configured to identify a dynamic change in message properties, connection properties, properties of a channel producing the message or a combination of the message, connection and channel properties and selectively apply the protection as needed to each message without a change to a predefined connection, wherein to selectively apply protection to the messages sent comprises applying protection to at least one message among the messages to be transmitted across the predefined connection prior to transmitting the at least one message across the predefined connection.

19. The collaborative system of claim 18, wherein the system variables include properties related to an interconnecting channel used by the endpoint to send messages.

20. The collaborative system of claim 18, wherein the system variables include properties related to each message sent by the endpoint.

21. The collaborative communication system of claim 18, wherein the system variables include interconnecting channel trustworthiness.

22. The collaborative communication system of claim 18, wherein the system variables include message sensitivity.

23. The collaborative communication system of claim 18, wherein the system variables include whether a message has previously been encrypted.

24. The collaborative communication system of claim 18, wherein at least some of the plurality of endpoints are configured to apply a decision criteria to the system variables in order to determine whether to apply protection to a message.

25. The collaborative communication system of claim 24, wherein at least some of the plurality of endpoints are configured to use different decision criteria relative to other of the plurality of endpoints.

26. The collaborative communication system of claim 24, wherein the system variables can be assigned a plurality of values, and wherein the decision criteria uses the values to determine whether protection should be applied.

27. The collaborative communication system of claim 26, wherein at least some of the plurality of endpoints are configured to assign a different value or weight to the system variables relative to other of the plurality of endpoints.

28. The collaborative communication system of claim 18, wherein at least some of the plurality of endpoints are configured to consider different system variables relative to other of the plurality of endpoints.

29. The collaboration system of claim 18, wherein the plurality of endpoints are configured to apply protection by encrypting the messages.

30. The collaboration system of claim 18, further comprising a plurality of intermediate nodes configured to pass messages from one endpoint to another via the plurality of interconnecting channels, and wherein the intermediate nodes are be configured to determine whether to apply protection to the messages on a per message basis.

31. The collaboration system of claim 18, further comprising a plurality of contexts, and wherein the plurality of endpoints are configured to join one or more of the plurality of contexts.

32. The collaboration system of claim 31, wherein at least some of the endpoint are configured to apply protection based on system variables, and wherein the system variables are different for different contexts of the plurality of contexts.

33. The collaboration system of claim 31, wherein at least some of the endpoints are configured to apply protection based decision criteria, and wherein the decision criteria are different for different contexts of the plurality of contexts.

* * * * *